United States Patent Office 3,813,435
Patented May 28, 1974

3,813,435
PROCESS FOR PREPARING METHYL-
PHOSPHONOTHIOIC DICHLORIDE
Alvin P. Wood, Holiday, Fla., and Kenneth Wayne Ratts, Creve Coeur, Mo., assignors to Monsanto Company, St. Louis, Mo.
No Drawing. Filed Oct. 27, 1969, Ser. No. 869,908
Int. Cl. C07f 9/42
U.S. Cl. 260—543 P        10 Claims

ABSTRACT OF THE DISCLOSURE

Method of making methylphosphonothioic dichloride from an alkali metal chloride, hydrogen sulfide, and a fluid mix of methyl trichlorophosphonium tetrachloroaluminate and methyl trichlorophosphonium heptachlorodialuminate.

---

This invention relates to a method of making methylphosphonothioic dichloride $$CH_3-\overset{S}{\underset{\|}{P}}-Cl_2$$

which compound is a well known intermediate in the manufacture of biologically active compounds, particularly the insecticidal methylphosphonothioates.

In accordance with this invention there is provided a convenient, efficient and relatively facile method of making methylphosphonothioic dichloride which method involves heating at a temperature in the range of from about 120° C. to about 220° C. an intimate fluid mixture comprising (1) a fluid mix of methyl trichlorophosphonium tetrachloroaluminate, $(CH_3PCl_3)^+(AlCl_4)^-$, and methyl trichlorophosphonium heptachlorodialuminate, $$(CH_3PCl_3)^+(Al_2Cl_7)^-,$$

(2) hydrogen sulfide in an amount on a molar basis equivalent to that based upon the total $PCl_3$ content initially present in the fluid mix precursor of (1), and (3) an alkali metal chloride in an amount on a molar basis of at least an equivalent to that based upon the total $PCl_3$ content initially present in the fluid mix precursor of (1). The by-product hydrogen chloride is removed as it forms. The methylphosphonothioic dichloride so produced is obtained in high yields and is readily recovered from the reaction mass by conventional methods, but preferably by vacuum distillation, in excellent purity.

By the expression "the total $PCl_3$ content initially present" as afore used and used hereinafter in the specification and claims is meant that amount equal to the sum total of phosphorus trichloride reagent actually combined with methyl chloride and aluminum chloride in providing for the precursor fluid mix of said methyl trichlorophosphonium tetrachloroaluminate and said methyl trichlorophosphonium heptachlorodialuminate. For example, in a mix of one molecular weight proportion of said tetrachloroaluminate and one molecular weight proportion of said heptachlorodialuminate "the total $PCl_3$ content initially present" is equal to two molecular weight proportions of phosphorus trichloride.

The components of the precursor fluid mix of the method of this invention are complexes and are well described in the literature [German pats. 1119860 and 1165597; J. P. Clay, J. Org. Chem., vol. 16, p. 892 ff. (1951); A. M. Kinnear and E. A. Perren, J. Chem Soc., p. 3437 ff. (1952); F. W. Hoffman et al., J. Am. Chem. Soc., vol. 79, p. 3570 ff. (1957)]. Methyl trichlorophosphonium tetrachloroaluminate is prepared from methyl chloride, phosphorus trichloride and aluminum chloride in a molar ratio of 1:1:1

$$CH_3Cl+PCl_3+AlCl_3 \rightarrow (CH_3PCl_3)^+(AlCl_4)^-$$

and is a solid at room temperature. Methyl trichlorophosphonium heptachlorodialuminate is prepared from methyl chloride, phosphorus trichloride and aluminum chloride in a molar ratio of 1:1:2

$$CH_3Cl+PCl_3+2AlCl_3 \rightarrow (CH_3PCl_3)^+(Al_2Cl_7)^-$$

and is a liquid at room temperature. In the preparation of these respective complexes one mol of methyl chloride is absorbed by a mixture of one mol of phosphorus trichloride and in the first case one mol of aluminum chloride and in the second case two mols of aluminum chloride. As is obvious by employing an amount of aluminum chloride in between the range of one mol and two mols per mol of phosphorus trichloride a mix of methyl trichlorophosphonium tetrachloroaluminate and heptachlorodialuminate is obtained which mix is fluid in nature and will vary as the content of the heptachlorodialuminate increases with respect to the tetrachloroaluminate content from a thick slurry to a liquid. In general any mix thereof which is stirrable can be employed but ordinarily in the method of this invention a fluid mix of from about one mol of the said tetrachloroaluminate to about 0.8 to about 4.0 mols of the said heptachlorodialuminate will be employed, while a substantially equimolecular mix thereof is preferred. This preferred mix of substantially equimolecular proportions is a relatively thin slurry at room temperature.

In the method of this invention the alkali metal chloride will be either potassium chloride or sodium chloride or mixtures thereof, but sodium chloride is preferred from the standpoint of economy and ease of processing. The minimum amount of alkali metal chloride employed will be that at least equivalent on a molar basis to that based upon the total $PCl_3$ content initially present in the aforedescribed precursor fluid mix of methyl trichlorophosphonium tetrachloroaluminate and methyl trichlorophosphonium heptachlorodialuminate. The maximum amount of alkali metal chloride ordinarily will be on a molar basis equivalent to about twice that based upon the total $AlCl_3$ content initially present in the aforedescribed precursor fluid mix. By the expression "the total $AlCl_3$ content initially present" as afore used and used hereinafter in the specification and claims is meant that amount equal to the sum total of aluminum trichloride reagent actually combined with methyl chloride and phosphorus chloride in providing for the precursor fluid mix of said methyl trichlorophosphonium tetrachloroaluminate and said methyl trichlorophosphonium heptachlorodialuminate. For example, in a mix of one molecular weight proportion of said tetrachloroaluminate and one molecular weight proportion of said heptachlorodialuminate "the total $AlCl_3$ content initially present" is equal to three molecular weight proportions of aluminum trichloride. In general when substantially equimolecular proportions of the respective components of the said fluid mix precursor of (1) are employed the amount of alkali metal chloride employed will be on a molar basis in the range of from about 2 to about 3 equivalents based upon the total $PCl_3$ content initially present in the said precursor fluid mix.

The amount of hydrogen sulfide employed in the method of this invention will be on a molar basis equivalent to that based upon the total $PCl_3$ content initially present in the aforedescribed precursor fluid mix of methyl trichlorophosphonium tetrachloroaluminate and heptachlorodialuminate. An excess of the so-defined molar equivalent of hydrogen sulfide is to be avoided for such provides for highly undesirable by-products while less than the so-defined molar equivalent obviously reduces the efficiency of the process. The hydrogen sulfide reagent can be added before or after or during the alkali metal chloride addition or in alternating steps with the alkali metal chloride to the aforesaid precursor fluid mix. In general, however, it is preferred that it be added after all of the alkali metal chloride has been added and mixed with the aforesaid precursor fluid mix. This preferred method of addition generally realizes higher product yields, and in particular greater ease of processing, for example the element of foaming due to too rapid hydrogen chloride evolution is substantially reduced while the fluidity of the reaction mixture is maintained substantially constant throughout the course of the reaction, and in particular during the attending step of recovering the methylphosphonothioic dichloride from the reaction mass by vacuum distillation. The reaction is completed when the amount of hydrogen sulfide absorbed and reacted in the reaction mass is on a molar basis equivalent to that based upon the total PCl$_3$ content initially present in the aforedescribed precursor fluid mix of tetrachloroaluminate and heptachlorodialuminate.

The reaction temperature employed in the method of this invention will be in the range of from about 120° C. to about 220° C., a specific range therein being determined by the stirrability of the reacting mass. In general the reacting mass becomes more fluid as the reacting temperature increases. When employing a precursor fluid mix of substantially equimolecular proportions of said tetrachloroaluminate and said heptachlorodialuminate reaction temperatures in the range of from about 140° C. to about 175° C. are preferred. Pressure is not critical in the method of this invention, the reaction usually being carried out at atmospheric pressure.

In the method of this invention hydrogen chloride is a by-product and is removed from the reacting mass by conventional means as it forms. The amount thereof is equivalent on a molar basis to twice that based upon the total PCl$_3$ content initially present in the precursor fluid mix of said tetrachloroaluminate and said heptachlorodialuminate. In other words ideally or theoretically the amount of by-product hydrogen chloride evolved and removed from the reacting mass is equivalent on a molar basis to twice the amount of hydrogen sulfide reagent absorbed and reacted in the reacting mass.

Upon absorption of the hydrogen sulfide reagent in the reacitng mass in an amount equivalent on a molar basis to that based upon the total PCl$_3$ content initially present in the precursor fluid mix aforedescribed with the concomitant or step-wise removal of by-product hydrogen chloride in two equivalent amounts thereto on a molar basis, the resulting reaction mass is subjected to a recovery operation to obtain the desired methylphosphonothioic dichloride, which recovery operation is preferably vacuum distillation.

The equipment utilized in the method of this invention will be of materials of construction such that corrosion due to the presence of the various reactants and products is not a serious problem.

In order to illustrate this invention but not limitative thereof is the following:

(A) To a 1.1 liter glass lined reaction vessel fitted with an agitator, thermometer, a sub-surface gas inlet tube, and a Dry-Ice condenser is charged 500 parts by weight (substantially 3.8 mols) of anhydrous aluminum chloride and 343 parts by weight (substantially 2.5 mols) of phosphorus trichloride. The so-charged mass is heated to the reflux temperature (about 73° C.) and 126 parts by weight (substantially 2.5 mols) of methyl chloride via the gas inlet tube is added over a period of about three hours while maintaining the reaction temperature in the range of about 73° C. to about 78° C. Upon completion of the methyl chloride addition the mass is heated with agitation at about 130° C. for about thirty minutes. The resulting mass is a thin slurry of a mixture of substantially equimolecular proportions of methyl trichlorophosphonium tetrachloroaluminate and methyl trichlorophosphonium heptachlorodialuminate. To this thin slurry is added with agitation 350 parts by weight (substantially 6.0 mols) of sodium chloride. This agitated mix is heated to about 160° C. and while maintaining approximately that temperature hydrogen sulfide is added beneath the surface thereof over a nine hour period until 86 parts by weight (substantially 2.5 mols) thereof are absorbed. (The evolving by-product hydrogen chloride, approximately 183 parts by weight, and excess of hydrogen sulfide are removed overhead and absorbed by passage thereof through two lye scrubbers in series, and the amounts of each gas collected at intervals determined in order to evaluate the reaction status.) The residue is then subjected to vacuum distillation at 190° C. at 20 millimeters of mercury pressure to give 327 parts by weight of methylphosphonothioic dichloride (an 88% by weight yield based upon the weight of hydrogen sulfide absorbed) of greater than 99% purity.

(B) Employing exactly the same procedure of (A) above but adding the 86 parts by weight of hydrogen sulfide over a three hour period, a yield of 82% by weight based upon the weight of hydrogen sulfide absorbed is obtained, the product having a purity of greater than 99%.

(C) To a 1.1 liter glass lined reaction vessel fitted with an agitator, thermometer, a sub-surface gas inlet tube, and a Dry-Ice condenser is charged 500 parts by weight (substantially 3.8 mols) of anhydrous aluminum chloride and 343 parts by weight (substantially 2.5 mols) of phosphorus trichloride. The so-charged mass is heated to the reflux temperature (about 73° C.) and 126 parts by weight (substantially 2.5 mols) of methyl chloride via the gas inlet tube is added over a period of about three hours while maintaining the reaction temperature in the range of about 73° C. to about 78° C. Upon completion of the methyl chloride addition the mass is heated with agitation at about 130° C. for about thirty minutes. The mass is a thin slurry of a mixture of substantially equimolecular proportions of methyl trichlorophosphonium tetrachloroaluminate and methyl trichlorophosphonium heptachlorodialuminate. While maintaining this thin slurry at about 140° C. to about 150° C. there is added with agitation hydrogen sulfide beneath the surface thereof over approximately a two hour period until 86 parts by weight (substantially 2.5 mols) are absorbed. (The evolving by-product hydrogen chloride, approximately 92 parts by weight, and excess of hydrogen sulfide are removed overhead and absorbed by passage thereof through two lye-scrubbers in series, and the amounts of each gas collected at intervals determined in order to evaluate the reaction status.) This agitated mix is heated to about 140° C. and while maintaining approximately that temperature and with continued agitation 298 parts by weight (substantially 4.0 mols) of potassium chloride are added, and thereafter the mass heated at approximately that temperature with agitation for about 40 minutes. (The evolving by-product hydrogen chloride, approximately 92 parts by weight, is removed overhead and absorbed by passage thereof through two lye scrubbers in series, and the amounts of gas collected at intervals determined in order to evaluate the reaction status.) The residue is then subjected to vacuum distillation at 190° C. at 20 millimeters of mercury pressure to give 301 parts by weight of methylphosphonothioic dichloride (an 83% by weight yield based upon the weight of hydrogen sulfide absorbed).

(D) Employing exacty the same procedure of (C) above but employing sodium chloride instead of potassium chloride on a molar equivalent basis substantially the same results are obtained.

As is evident from the foregoing Examples (A) and (B) the time or rate of addition of hydrogen sulfide can vary over a wide range but in general for any specifically defined weight thereof the shorter the addition time or faster the rate of addition the lower the yield of methylphosphonothioic dichloride. As is evident in Examples (A) and (B) hereinbefore the hydrogen chloride by-product is removed concomitantly with the hydrogen sulfide addition while in Examples (C) and (D) hereinbefore it is removed step-wise, half during the hydrogen sulfide addition and the other half removed after the alkali metal chloride addition. The reaction mechanism of the method of this invention is not fully comprehended, and it is therefore to be understood that the aforedescribed method regardless of the mode of adding and/or admixing the respective components of the aforedescribed intimate fluid mixture of (1), (2) and (3) described hereinbefore and in the appending claims is not limited or bound by any particular theory regarding the chemical reactions which take place therein. The limiting factor, if such be, is that for each molecular proportion of hydrogen sulfide absorbed and reacted two molecular proportions of by-product hydrogen chloride are realized and removed.

What is claimed is:

1. A method of making methylphosphonothioic dichloride which consists essentially of heating at a temperature in the range of from about 120° C. to about 220° C. an intimate fluid mixture comprising (1) a fluid mix of methyl trichlorophosphonium tetrachloroaluminate, $(CH_3PCl_3)^+(AlCl_4)^-$ and methyl trichlorophosphonium heptachlorodialuminate, $(CH_3PCl_3)^+(Al_2Cl_7)^-$, (2) hydrogen sulfide in an amount on a molar basis equivalent to that based upon the total $PCl_3$ content initially present in (1), and (3) an alkali metal chloride in an amount on a molar basis of at least an equivalent to that based upon the total $PCl_3$ content initially present in (1), said alkali metal chloride being selected from the group consisting of sodium chloride, potassium chloride, and mixtures thereof, and while heating removing the by-product hydrogen chloride as it forms.

2. The method of claim 1 wherein the alkali metal chloride is sodium chloride.

3. The method of claim 1 wherein the molar ratio of methyl trichlorophosphonium tetrachloroaluminate to heptachlorodialuminate of (1) is from about one of the former to about 0.8 to 4.0 of the latter.

4. A method of making methylphosphonothioic dichloride which consists essentially of heating at a temperature in the range of from about 120° C. to about 220° C. an intimate fluid mixture comprising (1) a fluid mix of from about one mol of methyl trichlorophosphonium tetrachloroaluminate, $(CH_3PCl_3)^+(AlCl_4)^-$, and from about 0.8 to 4.0 mols of methyl trichlorophosphonium heptachlorodialuminate, $(CH_3PCl_3)^+(Al_2Cl_7)^-$, (2) hydrogen sulfide in an amount on a molar basis equivalent to that based upon the total $PCl_3$ content initially present in (1), and (3) an alkali metal chloride in an amount on a molar basis of from at least an equivalent to that based upon the total $PCl_3$ content initially present in (1) up to and including an amount on a molar basis equivalent to about twice that based upon the total $AlCl_3$ content initially present in (1) said alkali metal chloride being selected from the group consisting of sodium chloride potassium chloride and mixtures thereof and while heating removing the by-product hydrogen chloride as it forms.

5. The method of claim 4 wherein the alkali metal chloride is sodium chloride.

6. The method of claim 4 wherein the alkali metal chloride is potassium chloride.

7. A method of making methylphosphonothioic dichloride which consists essentially of heating at a temperature in the range of from about 140° C. to about 175° C. an intimate fluid mixture comprising (1) a fluid mix of substantially equimolecular proportions of methyl trichlorophosphonium tetrachloroaluminate $(CH_3PCl_3)^+(AlCl_4)^-$ and methyl trichlorophosphonium heptachlorodialuminate, $(CH_3PCl_3)^+(Al_2Cl_7)^-$, and (2) sodium chloride in an amount on a molar basis of from about 2 to about 3 equivalents to that based upon the total $PCl_3$ content initially present in (1), and while heating said fluid mixture in said temperature range reacting therewith by adding below the surface thereof hydrogen sulfide in an amount on a molar basis equivalent to that based upon the total $PCl_3$ content initially present in (1), and while heating removing the by-product hydrogen chloride as it forms.

8. The method of claim 7 attended by the step of vacuum distilling from the reaction mass methylphosphonothioic dichloride.

9. The method of claim 4 wherein the alkali metal chloride is sodium chloride, which sodium chloride is admixed with (1) prior to the hydrogen sulfide addition.

10. The method of claim 4 wherein the alkali metal chloride is potassium chloride, which potassium chloride is added after approximately the theoretical amount of hydrogen sulfide has been absorbed and reacted with (1).

References Cited

Kinnear et al., J. Chem. Soc. (London) (1952), pp. 3437–3445.

Karavanov et al., Zhurnal Ob. Khimu (English translation), vol. 35, No. 1, pp. 76–77.

LORRAINE A. WEINBERGER, Primary Examiner

R. D. KELLY, Assistant Examiner